G. E. RIGBY.
SPRING SUSPENSION FOR THE WHEELS OF SIDE CARS FOR MOTOR CYCLES.
APPLICATION FILED SEPT. 7, 1916.
1,227,317. Patented May 22, 1917.
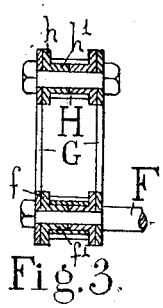
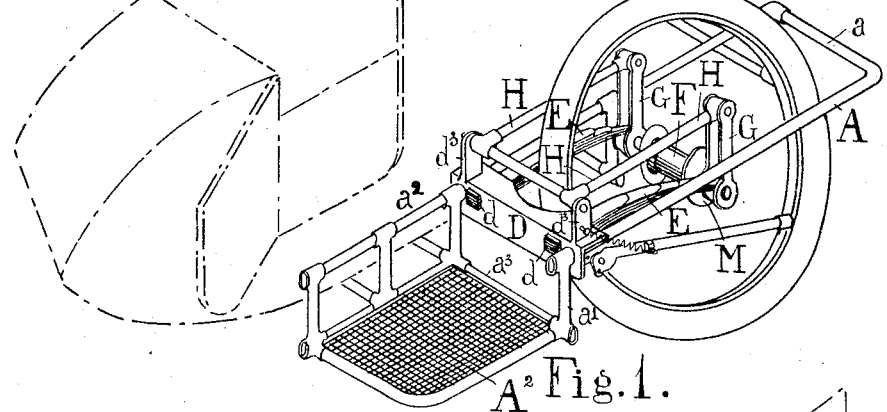
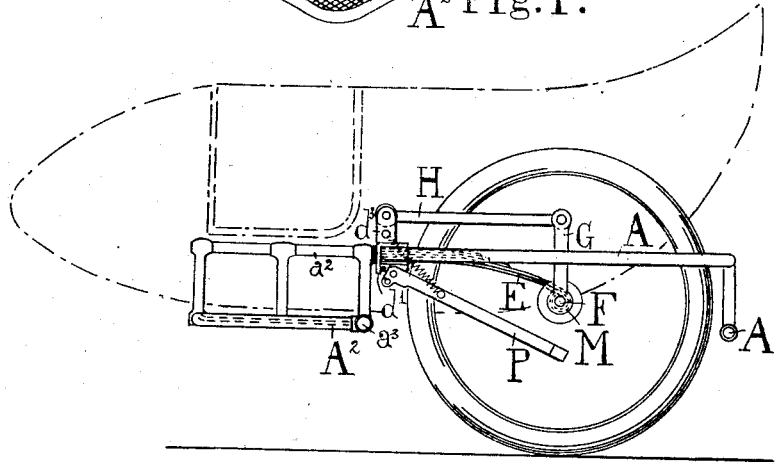
Witnesses:
Inventor
George E. Rigby
by
Attorney

UNITED STATES PATENT OFFICE.

GEORGE EDWIN RIGBY, OF MANCHESTER, ENGLAND.

SPRING SUSPENSION FOR THE WHEELS OF SIDE CARS FOR MOTOR-CYCLES.

1,227,317.  Specification of Letters Patent.  Patented May 22, 1917.

Application filed September 7, 1916. Serial No. 118,809.

*To all whom it may concern:*

Be it known that I, GEORGE EDWIN RIGBY, a British subject, residing at the city of Manchester, England, have invented certain new and useful Improvements in Spring Suspensions for the Wheels of Side Cars for Motor-Cycles, of which the following is a specification.

This invention relates to a spring frame or spring suspension for the wheel of a side car or similar vehicle for attachment to a motor cycle.

Referring to the drawings.

Figure 1 is a perspective view.

Fig. 2 is a side elevation.

Fig. 3 is a sectional detail of the axle and fork bearings.

The frame or chassis A upon which the car body is mounted is constructed with an elongated member $a$ extending rearward around the wheel, and rigidly secured to the chassis in front of the wheel is a transverse housing bracket D, this housing bracket D being held rigid by the frame members $a$ $a'$ $a^2$ $a^3$. The frame members $a$, $a'$, $a^2$, and $a^3$ also support a foot board $A^2$. The bracket D is formed with sockets $d$ and lugs $d^3$; and two laminated springs E, one at either side of the wheel, each having one end secured in one of the sockets $d$ extend rearward toward the back of the car.

The bearings M for the wheel axle F are carried by the free ends of the springs E, each of the latter being formed into a loop into which the bearing bush is inserted.

A fork H has its free ends extending rearwardly above the wheel axle and to these free ends the axle bearings are connected by links G. The fork H is pivoted upon a bolt passing through the lugs $d^3$ of the bracket D and is sufficiently stiff to prevent any movement of one member without a corresponding movement in the other. The fork H thus synchronizes the movement of the springs E and prevents any lateral sway or tilting of the wheel, the wheel axle being maintained parallel to the transverse axis of the car and chassis.

It will be obvious that a fork similar to H may be pivoted to the underside of the bracket D and the links G extend from the axle bearing downward thereto.

The axle bearings are formed with side plates or cheeks $f$ each having a bushing $f'$ which enters a loop or eye on the free end of one of the springs E, and through which the axle F passes, the total length of the bushings in each loop slightly exceeding the width of one of the springs so that, when bolted in position free movement of the springs between the plates and upon the bushings is permitted. The bearings of the fork H are similar to those of the axle bearings, that is to say, the bearings of the fork are provided with cheeks $h$ and bushings $h'$ which enter the bosses on the end of the fork, the length of the two bushings being slightly greater than the width of the boss. The links G are placed outside the side cheeks of the bushings $f'$ and $h'$ and are secured by nuts on the ends of the axle F and by a bolt or spindle passed through them and the bosses of the fork. The side cheeks $f$ and $h$ may be extended to form the links, the bushings being formed as a part of them.

A spring stand P is also pivoted to the transverse housing bracket D in advance of the wheel and can be let down to raise the wheel from the ground. This stand P is designed to use in connection with spring wheels and may be applied to the wheels described in my prior specifications Serial Nos. 108185 and 108186. It is anchored in front of the wheel, to the housing of the springs or to the frame or chassis, or to the gear bracket or other fixed part of the frame. It is made with a leg at one or both sides of the wheel.

What I claim as my invention and desire to protect by Letters Patent is:—

1. A spring suspension for the wheel of a side car, comprising a chassis, frame members extending laterally to the side of the car, a transverse housing bracket carried by the frame members and provided with sockets and lugs, a pair of springs each having one end secured in one of the sockets of said housing bracket and having a loop at its free end, a fork pivoted to the lugs of said bracket, axle bearings mounted in the loops at the ends of the springs, and links connecting the axle bearings with the free ends of the fork.

2. In a spring suspension for the wheels of side cars, a pair of springs, means carried by the chassis of the side car for supporting one end of each of said springs, a fork pivotally mounted on said spring supporting means, an axle bearing carried by the free end of each of the springs, each of said bearings having a side cheek on each side of its spring, an axle extending through said bearings, a bearing carried by each of the free ends of the fork, each of said bearings having a side cheek at each side of that end of the fork by which it is carried, and a pair of links at each end of the axle, one on each side of each of said springs, said links connecting the axle bearings to the bearings at the ends of said forks.

3. In a side car, supporting means extending from one side of the chassis, a pair of springs each having one end secured to said supporting means and its opposite end adapted to support one end of the wheel axle, a wheel axle, a fork pivotally mounted on said supporting means, and links, connecting the axle adjacent its opposite ends to the free ends of said forks respectively.

In testimony whereof I have hereunto set my hand in presence of two subscribing witnesses.

GEORGE EDWIN RIGBY.

Witnesses:
J. OWDEN O'BRIEN,
GEO. H. O'BRIEN.

Copies of this patent may be obtained for five cents each, by addressing the "Commissioner of Patents, Washington, D. C."